United States Patent

[11] 3,549,890

| [72] | Inventor | Rene Keller<br>Dietikon, Switzerland |
|---|---|---|
| [21] | Appl. No. | 791,593 |
| [22] | Filed | Jan. 16, 1969 |
| [45] | Patented | Dec. 22, 1970 |
| [73] | Assignee | Emhart Corporation<br>Bloomfield, Conn.<br>a corporation of Connecticut |

[54] ARTICLE INSPECTION APPARATUS
10 Claims, 4 Drawing Figs.

[52] U.S. Cl. .................................................. 250/209,
209/111.7; 250/220, 250/223; 340/146.3
[51] Int. Cl. ...................................................... H03k 5/18,
H01j 39/12
[50] Field of Search ............................................ 250/208,
209, 219, 220, 222, 223; 340/146.3(optical);
209/111.7

[56] References Cited
UNITED STATES PATENTS

| 3,089,594 | 5/1963 | Early .............................. | 209/111.5 |
| 3,265,901 | 8/1966 | Schneider ....................... | 250/223 |
| 3,365,699 | 1/1968 | Foster .......................... | 340/146.3 |
| 3,436,555 | 4/1969 | Foster .......................... | 250/223 |

*Primary Examiner*—James W. Lawrence
*Assistant Examiner*—E. R. La Roche
*Attorney*—Mc Cormick, Paulding and Huber ABSTRACT: Two mutually perpendicular light beam patterns are directed across a continuously moving conveyor toward an array of light sensitive devices some of which will be illuminated and some of which will be in shadow if the shape of an inspected article is acceptable. These devices are arranged spaced in pairs, and individual signals from these pairs are stored for simultaneous recall after the article has been completely inspected. A lower pair of such devices, closely spaced in relationship to the width of the article, generate a stretched signal for a novel circuit adapted to accept an upright article although it is leaning slightly with respect to a line normal to the conveyor. This leaner inspection circuitry includes pulse generating and counting mean and utilizes the aforementioned signal from the lower pair of light sensitive devices to accomplish this inspection for excessive leaning without adversely effecting the article-shape inspection.

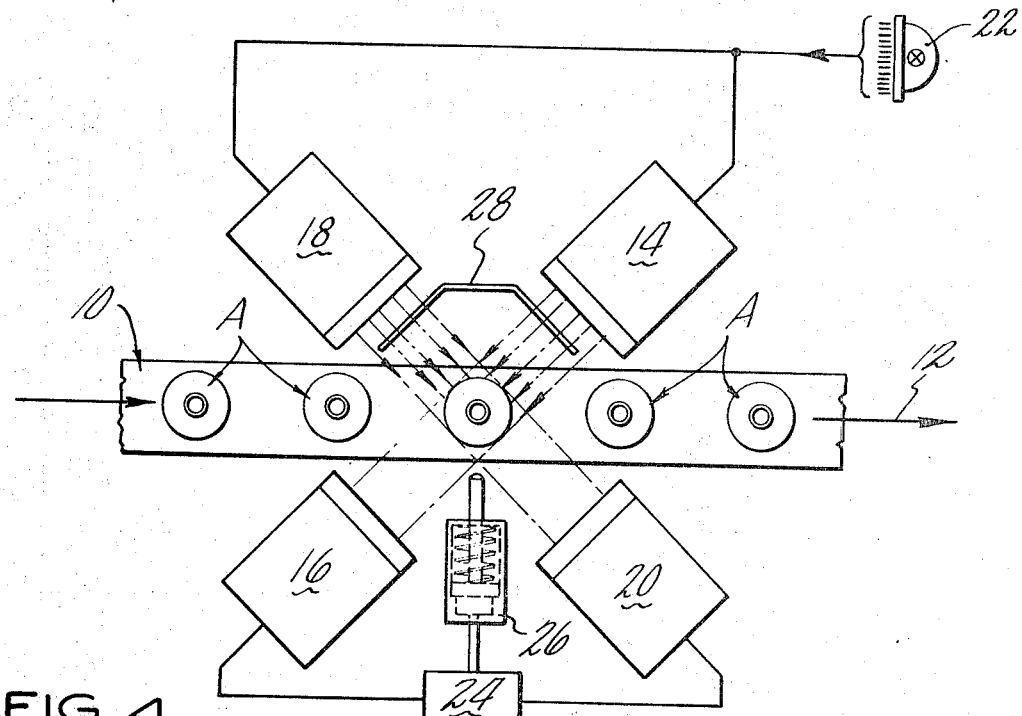
FIG_1
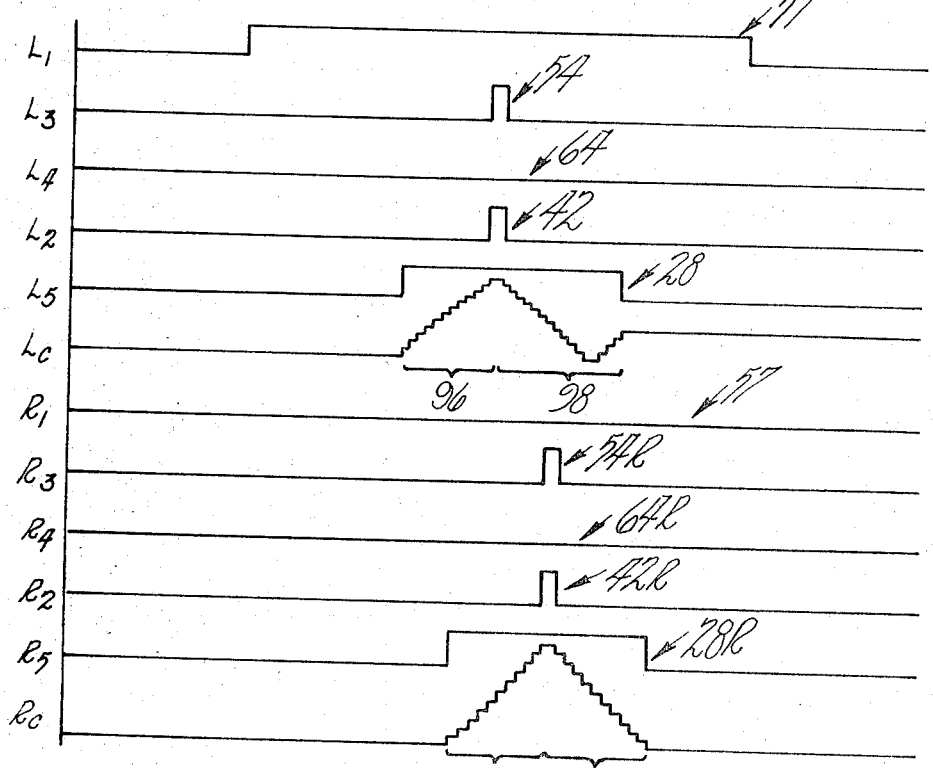
FIG_4
INVENTOR
RENE' KELLER
BY McCormick, Paulding & Huber
ATTORNEYS

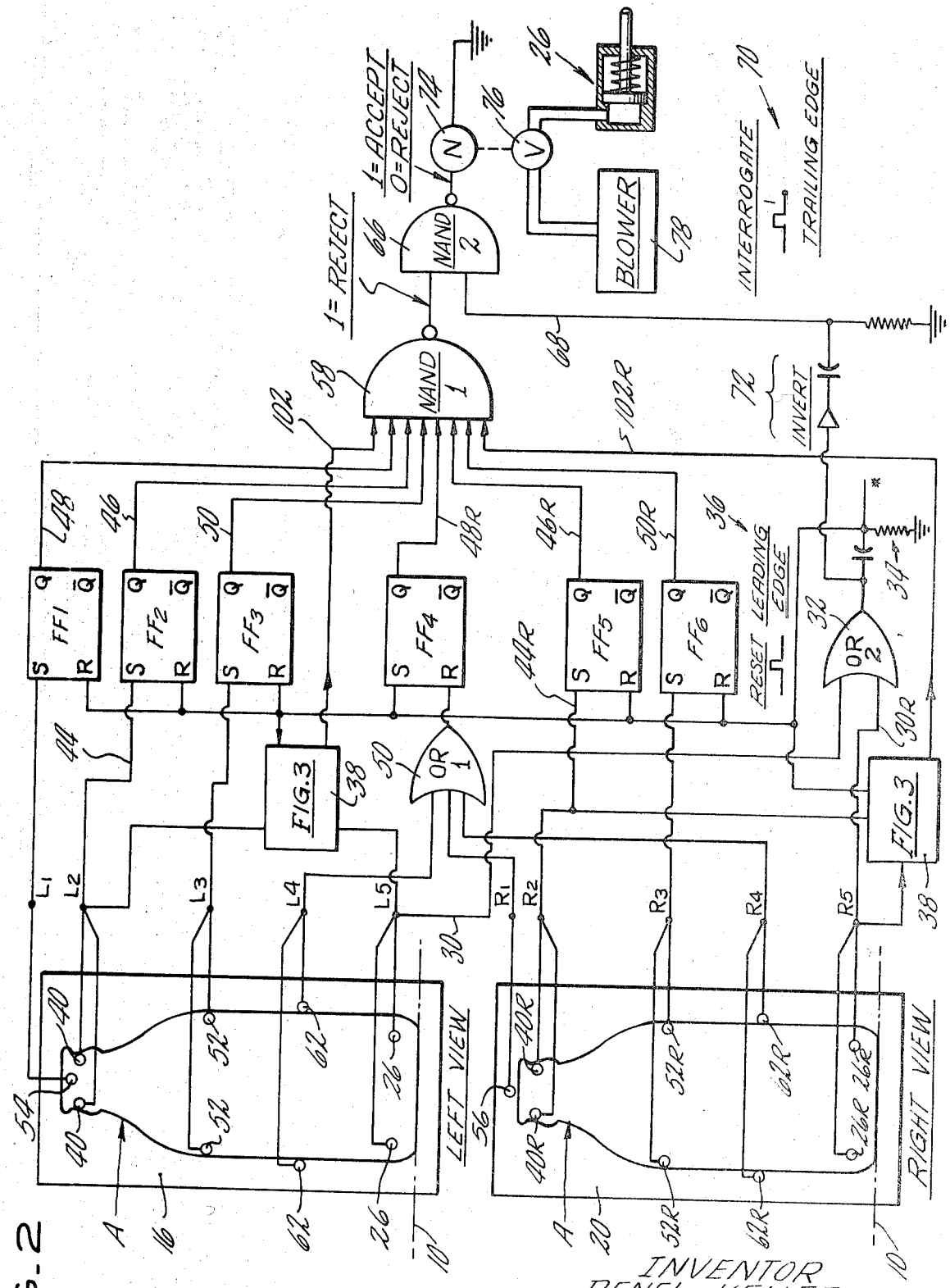

[3,549,890]

ARTICLE INSPECTION APPARATUS

SUMMARY OF INVENTION

This invention relates generally to article inspection apparatus, and deals more particularly with an apparatus capable of checking articles for proper shape or silhouette as these articles are continuously moved by a conveyor, and which apparatus is also capable of checking the moving articles for excessive leaning with respect to their normal position on the conveyor.

An object of the present invention is to provide an inspection apparatus of the foregoing character wherein the articles are inspected for shape and for excessive leaning in two mutually perpendicular reference planes as the articles are moved continuously, without rotating, on a conventional conveyor.

Another object of the present invention is to provide an inspection apparatus of the foregoing character wherein the leaner inspection does not have a deleterious effect on the shape or silhouette inspection, rendering an apparatus of the present invention particularly useful for inspecting glassware articles wherein a so called "leaner" is often acceptable if the degree of lean is not excessive, but which article must nevertheless have a particular shape or outline to be safely handled by other equipment, such as "finish" inspection equipment wherein the glassware is rotated, or in labeling, or in filling machines.

Another object of the present invention is to provide an inspection apparatus of the foregoing character wherein both of two mutually perpendicular inspection directions are oriented at 45° to the direction of article movement on a conveyor, and wherein inspection direction comprises a plurality of individual light sensitive devices operating in independent pairs so that no "pilot beam" or "gaging pulse" is required to record the instantaneous condition of all of these devices, and so that the article being inspected does not have to be precisely centered on the conveyor by a lateral positioning bar or other guide means.

A still further object of the present invention is to provide an inspection apparatus of the foregoing character wherein pairs of light sensitive devices generate signals indicative of the girth of the article at a particular vertical location, all of the signals being stored for subsequent recall in order to permit the "leaner" circuitry to utilize at least some of the signals for detecting articles with an unacceptable degree of lean.

BRIEF DESCRIPTION OF DRAWINGS

FIG. 1 is a plan view of a preferred embodiment of the present invention showing a continuously operating conveyor for feeding articles through two mutually perpendicular light beam patterns so that corresponding arrays of light sensitive devices can detect abnormalities in the shape of each article and/or the orientation of its vertical axis with respect to the plane of the conveyor.

FIG. 2 is an electrical schematic illustration of the circuitry used in the apparatus of FIG. 1.

FIG. 4 is a schematic illustration of the relative duration of the various signals associated with the pairs of light sensitive devices shown in FIG. 2.

DETAILED DESCRIPTION

Figure 3:
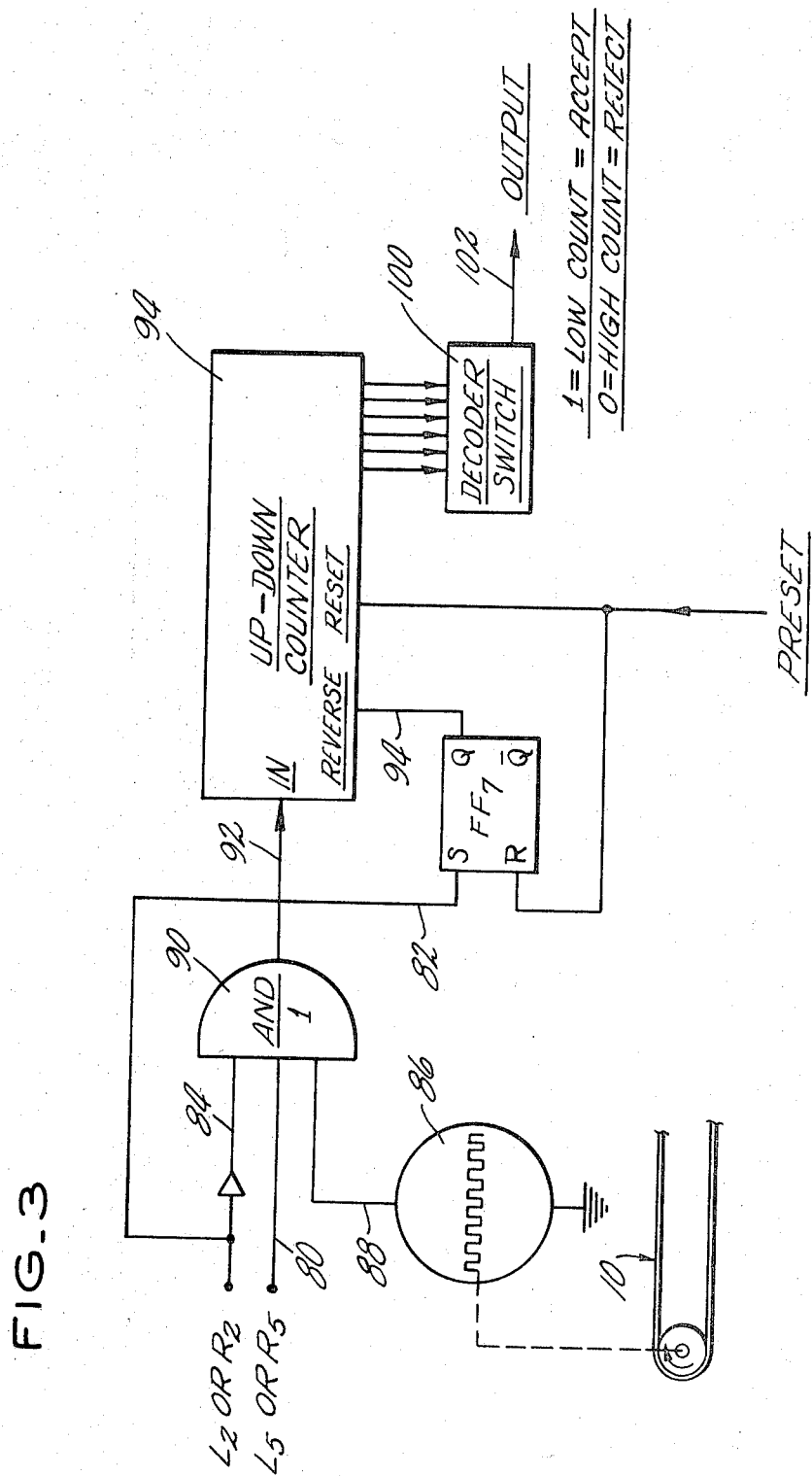
FIG. 3 is a detailed schematic of portions of the circuitry used in FIG. 2.

Turning now to the drawings in greater detail, FIG. 1 shows one form of preferred apparatus for inspecting upright articles A, A as they are advanced in longitudinally spaced relationship on a conveyor 10 of conventional construction having an upper run adapted to continuously feed the articles A, A in the direction of the arrow 12. It is a feature of the present invention that the articles do not have to be precisely spaced longitudinally on the conveyor, nor do they have to be precisely centered thereon in order to be inspected by the apparatus to be described. However, it has been found that these articles should, preferably, be spaced from one another by a distance of approximately one article width or diameter.

In accordance with the present invention, means is provided on one side of the conveyor for directing a plurality of pairs of light beams transversly across the conveyor. However, rather than directing these light beams at right angles to the direction of article travel it is an important feature of the present invention that the plurality of light beams from one particular source unit 14 are directed transversly at approximately 45° with respect to the direction of movement of the articles on the conveyor toward an array of light responsive means mounted on an opposite side of the conveyor, as indicated generally at 16. An additional unit 18 is provided on the other side of the conveyor for directing a plurality of light beams across the conveyor at approximately 90° with respect to the direction of the light beams in the first unit 14 toward an additional array of light responsive means 20 located on the opposite side of the conveyor. As so constructed and arranged it will be apparent that the article A can be inspected in two distinct mutually perpendicular cross-sectional profiles without the necessity for rotating the articles with respect to the conveyor, or with respect to the fixed inspection apparatus 14, 16, 18, and 20. Preferably, a single light source 22 is connected to conventional bundles of light conductors to bring the light to the units 14 and 18.

The various signals from each of the light sensitive devices in the units 16 and 20, are fed to a signal conditioning unit 24 for control of a reject device 26, for rejecting unaccetable articles through the use of a conventional solenoid controlled air operated piston-cylinder which is capable of displacing an acceptable article laterally off the conveyor 10 and into a cull chute 28.

Turning next to FIG. 2, wherein the two arrays of light responsive means 16 and 20, are shown in elevation, and are labeled left and right to indicate their upstream and downstream positions, the instantaneous position of a completely acceptable article A is there shown with respect to the preferred pattern of light responsive means 26, 62, 52, 40 and 54. Considering first the so-called left view of the downstream array 16, it will be apparent that the majority of the light responsive means are arranged in pairs at various vertical positions corresponding to various body diameters of the glassware article A being inspected. A first pair of light responsive means 26, 26 in the array 16 are disposed adjacent the surface of the conveyor 10 and in spaced horizontal relationship to one another, which horizontal displacement is significantly less than the corresponding dimension, or diameter, of the base portion of the upright glassware article A. Thus, the photocell labeled L5 will generate a "first" signal 28 while both light responsive means in the pair 26, 26 are not illuminated through a conventional signal reversing device typical of all the pairs of light responsive means to be described. The so called "first" signal 28 is shown in FIG. 4 as of extended duration and is carried to an "or" gate 32 which utilizes either this "first" signal 28, or a corresponding "first" signal 28R generated by the pair light responsive means 26R, 26R in the right hand unit 20. thus, the "or" gate 32 accepts either the first signal 28 from the left hand unit of light responsive means 16 or a corresponding signal 28R from the corresponding pair 26R, 26R of the unit 20 depending upon which of these two "-first" signals occurs first in time with respect to the other.

As shown in FIG. 4, the signal 28 caused by the left hand pair 26, 26 of light responsive means does in fact occur first, indicating simply that the glassware article A being inspected is located to the right of center on the conveyor 10, looking in the downstream direction. With further reference to FIG. 2, the output of the "or" gate 32 is differentiated by conventional means, indicated generally at 34, in order to generate a reset signal (corresponding in time to the leading edge of the output signal of the "or" gate 32) for resetting each of the flip-flops, $FF_1$, $FF_2$, $FF_3$, $FF_5$, and $FF_6$. As is characteristic of a flip-flop generally, the positive output Q is thus reset to zero, and negative output $\overline{Q}$ (not used) reset to one in the binary language adopted herein. The "first" signal generated by the light responsive means 26 and 26R is simultaneously fed to leaner detection circuitry, indicated generally at 38, to be described in greater detail hereinbelow.

A second pair of light responsive means 40, 40 in the left hand unit 16 is disposed well above the conveyor surface, with a generally horizontal displacement therebetween only slightly less than the corresponding dimension of an upper portion of the upright glassware article. The right hand unit 20 has a similar, or corresponding pair 40R, 40R of light responsive means and these photocells generate corresponding signals 42 and 42R best shown in FIG. 4, of much shorter duration than the duration of the "first" signal 28 and 28R. The "second" signal 42 is fed to flip-flop $FF_2$ by means of conductor 44 to set flip-flop $FF_2$ so that its output 46 will be "one" in binary language at least for a particular instant of time not necessarily corresponding with the instantaneous condition of the signal in lines 48 and 50 for example. The binary signal is then available to the signal summing device 58 to be described.

The so called "second" signal 42R is similarly fed to flip-flop $FF_5$ for storage. These second signals 42 and 42R are also provided as inputs to the leaner circuitry 38, 38 shown in greater detail in FIG. 3.

Still with reference to FIG. 2, each of the units 16 and 20, further include at least one additional pair of spaced light responsive means 52, 52 and 52R, 52R respectively. Each of these light responsive means are located with a horizontal displacement therebetween which is only slightly less than the corresponding dimension of an intermediate portion of the upright glassware article A. Means is provided, including signal reversal means, for producing "third" signals 54 and 54R when the pairs of light responsive means 52 and 52R are covered or blocked by an article being inspected. Such a signal indicates that the particular article has at least a minimum girth at its intermediate body portion. These "third" signals are stored in flip-flops $FF_3$ and $FF_6$ for producing binary signals in the branches 50 and 50R in a manner similar to the binary signals provided in the branch lines 46 and 46R. These binary signals are also available to the device 58 to be described.

The light responsive units 16 and 20 further include at least one light responsive means 54 and 56 respectively adjacent the uppermost end of the article A for producing a "fourth" signal 55 best shown in FIG. 4, when the article is above a predetermined minimum height and for producing no signal, as indicated at 57 in FIG. 4, when the article is below a predetermined maximum height. The "fourth" signal 55 is adapted to set flip-flop $FF_1$ the output of which is carried to the signal summing device 58 by a branch line 48 generally similar to the branch lines 46 and 50 associated with the light sensitive means 40 and 52 discussed hereinabove. The signal 57 or more correctly the lack of such a signal from the light responsive means 56, is fed to an "or" gate 60, the output of which is used to reset flip-flop $FF_4$ so that its output in branch line 48R is reset to zero only when an article A is above the maximum permissible height for an acceptable glassware article.

Still another pair of spaced light responsive means 62, 62 and 62R, 62R is provided in the respective arrays 16 and 20, being arranged adjacent the pairs 52, 52 and 52R and 52R and preferably spaced from one another by a distance slightly greater then the corresponding body diameter dimension of the associated intermediate portion of the glassware article. These pairs of light responsive means 62, 62 and 62R, 62R will produce no signal for an acceptable article A as indicated in FIG. 4, and conversly should the article A be oversized in body diameter at its midportion the means 62, 62 or 62R, 62R will produce a positive signal to the "or" gate 60 for resetting the flip-flop $FF_4$, with the result that no signal will be provided in branch line 48R to the signal summing, "nand" gate 58 device. As mentioned hereinabove the reset signal produced by the leading edge of pulse 28 or pulse 28R serves to reset all of the flip-flops shown in FIG. 2 except flip-flop $FF_4$, flip-flop $FF_4$ is set by the reset pulse 36, only to be reset in response to an output from the "or" gate 60 as just described. Thus, for an acceptable article of glassware all of the branch lines 46, 48, 50, 48R, 46R, 50R will provide a binary pulse to the "nand" gate 58, which characteristically produces no output when all of its inputs are "ones." The second "nand" gate 66 will normally produce a positive output until, upon interrogation by a signal in the branch line 68, the first "nand" gate 58 indicates that a particular article should be rejected. The interrogation pulse, shown at 70 in FIG. 2, provided in the branch line 68 is formed from the trailing edge of the "first" signal 28, or 28R, through conventional components indicated generally at 72. Thus, a positive output by the second "nand" gate 66, cause by an interrogation pulse 68 and a positive output from the first "nand" gate 58 energizes solenoid 74 preventing the valve 76 from opening. Conversely, when the interrogation pulse 70 provided in branch lines 68 is accompanied by a reject signal from the first "nand" gate 58 the second "nand" gate 66 will interrupt current to the solenoid 74, opening valve 76 and allowing air under pressure from the source 78 to operate the reject mechanism, indicated schematically at 26.

Turning now to a description of the leaner detection circuitry indicated schematically for both the left hand and right units 16 and 20, FIG. 3 shows the various components provided in each of these identical branches of the overall circuitry embodied in the apparatus of FIG. 1. As mentioned hereinabove, the leading edge of the so called "first" signal 28 or 28R provides a positive pulse in branch line 80. The so called "second" pulse produced by the light responsive means 40 and 40R is provided in branch line 82, and is inverted in branch line 84 by conventional means. A conventional pulse generator 86 is continuously driven from the continuously operated conveyor 10 to provide a continuous series of pulses in the branch line 88 so that "and" gate 90 is provided with a positive output in the line 92 as soon as the "first" signal 28 or 28R occurs. An "up-down" counter 94 is triggered thereby and counts the number of pulses generated from this time until such time as a positive signal from the branch line 84 is interrupted by reason of the initiation or appearance, of signal 42, or 42R, from L—2. At this point "and" gate 90 does not have its full complement of inputs, and no input is provided to the unit 94 through the line 92. Instead, the second signal 42, or 42R is fed to a flip-flop $FF_7$ to set the flip-flop and generate an output in branch line 94 to reverse the "up-down" counter 94 as indicated schematically at Lc and Rc in FIG. 4. Thus, the counter 94 will have stored the number of pulses recorded earlier and will have been programmed to record the number of pulses generated when "and" gate 90 is again provided with its full complement of inputs. This situation will obtain as soon as the second signal 42, or 42R, is interrupted as a result of the inverted character of the signal in line 84. This secondary counting will continue until the signal in input branch 80 to the "and" gate 90 is interrupted as a result of the disappearance of absence of the "first" signal from L—5 or R—5. The representation of this pulse counting operation is indicated schematically in FIG. 4 for each of the leaner circuits associated with the left-hand and right-hand units 16 and 20. In the event that a so-called "leaner" is encountered by the inspection apparatus, the number of pulses initially generated will not correspond exactly to the number of pulses generated upon reversal of the counter. This situation is illustrated in FIG. 4 at 96 and 98 showing that the article being inspected does not have its neck portion exactly centered above it's lower body portion. In the example shown the "leaner" is such that this particular glassware article appears to the right hand unit 20 as an upright bottle. Thus, the signal produced by the right hand counter 94R comprises an equal number of up and down pulses as indicated generally at 96R and 98R. Since some degree of leaning can be tolerated in glassware articles generally, a variable decoder switch 100 is provided for presetting the tolerances which will be accepted by the apparatus, and hence produce no output in the line 102. As shown in FIG. 2 these output lines 102 and 102R from the leaner circuits shown in FIG. 3 are provided as inputs to the first "and" gate 58 and are accepted thereby in a manner similar to the various inputs thereto described previously.

The "up-down" counter 94 is reset from the reset signal 36 generated by the leading edge, or appearance, of the first signal 28 or 28R, as is the flip-flop flop $FF_7$, so that the various components of the circuitry described will not be reset until the next article to be inspected has reached a position on the conveyor wherein it blanks out both the first pairs of light responsive means 26 and 26R.

I claim:

1. An apparatus for inspecting upright articles as they are advanced on a conveyor and comprising in combination, at least one array of light responsive means mounted on one side of the conveyor, means on the opposite side of the conveyor for directing a plurality of light beams toward said light responsive means, a first pair of light responsive means in said array disposed adjacent the surface of the conveyor, said light responsive means being in spaced relationship to one another through a horizontal displacement significantly less than the corresponding dimension of the base portion of the upright article, means for generating a first signal while said first pair of light responsive means are not illuminated, pulse generating means operable in timed relationship to the speed of the conveyor, counter means for recording the pulses so produced during the duration of said first signal, means controlled by said first signal for coupling the pulses to the counter means, a second pair of light responsive means in said array disposed above the conveyor surface, said second light responsive means having a generally horizontal displacement therebetween which is only slightly less than the corresponding dimension of an upper portion of the upright article, means for generating a second signal when said second pair of light responsive means are not illuminated, means coupling said second signal to said counter means, said counter means including means for comparing the number of pulses recorded prior to the occurence of said second signal with the number of pulses recorded subsequent to the occurence of said second signal in order to provide a quantitative measure of the degree of tilt of the article with respect to the conveyor in a first vertical plane.

2. The combination set forth in claim 1 wherein said at least one array further includes at least one additional pair of spaced light responsive means located with a horizontal displacement therebetween which is only slightly less than the corresponding dimension of an intermediate portion of the article, means for producing a third signal when said one additional pair of light responsive means is covered indicating that the article has a minimum girth, signal-storing means for retaining said second and third signals and means responsive to the disappearance of said first signal for interrogating said signal-storing means.

3. The combination set forth in claim 1 wherein said at least one array further includes at least one light responsive means adjacent the uppermost end of the article, means for producing a fourth signal when the article is above a predetermined height, signal-storing means for retaining said second and fourth signals, and means responsive to the disappearance of said first signal for interrogating said signal-storing means.

4. The combination set forth in claim 3 further characterized by means responsive to the appearance of said first signal for resetting said signal-storing means.

5. The combination set forth in claim 1 further characterized by said one array and its associated light beams being oriented at an acute angle with respect to the direction of movement of the articles on said conveyor, and a second array of light responsive means with associated light beams oriented at a substantial angle with respect to the first, and corresponding circuitry for measuring the degree of tilt of the article in a second vertical plane oriented at a substantial angle with respect to the first vertical plane.

6. The combination set forth in claim 2 wherein said at least one array includes still another pair of spaced light responsive means located adjacent said one additional pair with a horizontal displacement therebetween which is slightly greater than said corresponding dimension of said intermediate portion of said article, means including a flip-flop register which is triggered by the appearance of said first signal for generating a fifth signal for storage, and means for interrogating said signal storing means upon the disappearance of said first signal.

7. The combination set forth in claim 5 wherein both arrays have pulse producing and pulse counting means, first and second pairs of light responsive means in both arrays so spaced as to measure the tilt of the article in cross-sectional planes which are substantially perpendicular.

8. The combination set forth in claim 5 wherein both arrays have signal-storing means and light responsive means for inspecting each articles minimum girth or height respectively in two mutually perpendicular planes, and said means responsive to the disappearance of said first signal also being responsive to a corresponding signal from said additional array when the latter signal occurs first.

9. The combination set forth in claim 8 wherein both arrays include other pairs of spaced light responsive means located adjacent said minimum girth detecting pairs and having a displacement therebetween which is slightly greater than said intermediate girth dimension, and means including a flip-flop register which is triggered by the appearance of either of said first or said corresponding signal for generating a fifth signal for storage, and means for interrogating said signal-storing means upon the disappearance of said first signal.

10. The combination set forth in claim 3 wherein said at least one array includes still another pair of spaced light responsive means located adjacent said one additional pair with a horizontal displacement therebetween which is slightly greater than said corresponding dimension of said intermediate portion of said article, means including a flip-flop register which is triggered by the appearance of said first signal for generating a fifth signal for storage, and means for interrogating said signal-storing means upon the disappearance of said first signal.